(12) United States Patent
Sato

(10) Patent No.: US 8,933,924 B2
(45) Date of Patent: Jan. 13, 2015

(54) DISPLAY DEVICE AND ELECTRONIC UNIT

(75) Inventor: Yoshihisa Sato, Saitama (JP)

(73) Assignee: Sony Corporation, Tokyo (JP)

( * ) Notice: Subject to any disclaimer, the term of this patent is extended or adjusted under 35 U.S.C. 154(b) by 107 days.

(21) Appl. No.: 13/556,628

(22) Filed: Jul. 24, 2012

(65) Prior Publication Data

US 2013/0050177 A1    Feb. 28, 2013

(30) Foreign Application Priority Data

Aug. 30, 2011    (JP) ................. 2011-187457

(51) Int. Cl.
   *G06F 3/038*     (2013.01)
   *H04N 13/04*     (2006.01)
   *G09G 3/00*     (2006.01)
   *G02B 27/22*     (2006.01)

(52) U.S. Cl.
   CPC ....... *H04N 13/0409* (2013.01); *H04N 13/0413* (2013.01); *H04N 13/0445* (2013.01); *G09G 3/003* (2013.01); *G02B 27/2214* (2013.01); *G02B 27/2264* (2013.01)
   USPC ........................................ 345/214

(58) Field of Classification Search
   None
   See application file for complete search history.

(56) References Cited

U.S. PATENT DOCUMENTS

| | | | |
|---|---|---|---|
| 7,532,225 B2 | 5/2009 | Fukushima et al. | |
| 2002/0105579 A1 | 8/2002 | Levine et al. | |
| 2002/0122123 A1 | 9/2002 | Kimura | |
| 2005/0063513 A1 | 3/2005 | Hsieh et al. | |
| 2008/0107358 A1 | 5/2008 | Saito | |
| 2008/0278609 A1 | 11/2008 | Otsuki | |
| 2008/0291296 A1 | 11/2008 | Oike | |
| 2009/0310849 A1 | 12/2009 | Katou | |
| 2010/0085517 A1 | 4/2010 | Hong | |
| 2011/0069204 A1 | 3/2011 | Vakrat et al. | |
| 2011/0157471 A1 | 6/2011 | Seshadri et al. | |
| 2012/0194686 A1 | 8/2012 | Lin et al. | |
| 2012/0229442 A1* | 9/2012 | Inoue | 345/212 |
| 2012/0256974 A1* | 10/2012 | Minami | 345/690 |
| 2012/0268627 A1 | 10/2012 | Oike | |
| 2012/0306864 A1* | 12/2012 | Inoue | 345/419 |
| 2013/0033616 A1 | 2/2013 | Kaizu et al. | |
| 2013/0050284 A1 | 2/2013 | Sato | |
| 2013/0076723 A1* | 3/2013 | Niioka et al. | 345/212 |
| 2013/0293534 A1 | 11/2013 | Sato et al. | |

FOREIGN PATENT DOCUMENTS

| | | |
|---|---|---|
| JP | 02-174470 A | 7/1990 |
| JP | 07-095481 A | 4/1995 |
| JP | 11-075118 A | 3/1999 |
| JP | 2004-118140 A | 4/2004 |
| JP | 2006-253876 A | 9/2006 |
| JP | 2008-147818 A | 6/2008 |
| JP | 2008-294698 A | 12/2008 |
| JP | 4689620 B2 | 5/2011 |
| WO | WO 2006-049098 A1 | 5/2006 |

* cited by examiner

*Primary Examiner* — Adam R Giesy

(74) *Attorney, Agent, or Firm* — Wolf, Greenfield & Sacks, P.C.

(57) ABSTRACT

A display device includes: a display section including a plurality of pixels, the display section allocating N-number of perspective images to the pixels to display the N-number of perspective images, where N is an integer representing number of the perspective images; a display drive circuit cyclically changing a correspondence relationship between the perspective images and the pixels from one to another of first to Mth states, where M is an integer representing number of the states; a plurality of selectors each selecting any from among traveling angle directions of a perspective image from the pixels; and a selector drive circuit controlling positions of the selectors to be cyclically changed from one to another of first to Mth states, the selector drive circuit operating in synchronization with the display drive circuit. A relationship 0<M<N is established, and N is a non-integer multiple of M.

10 Claims, 26 Drawing Sheets

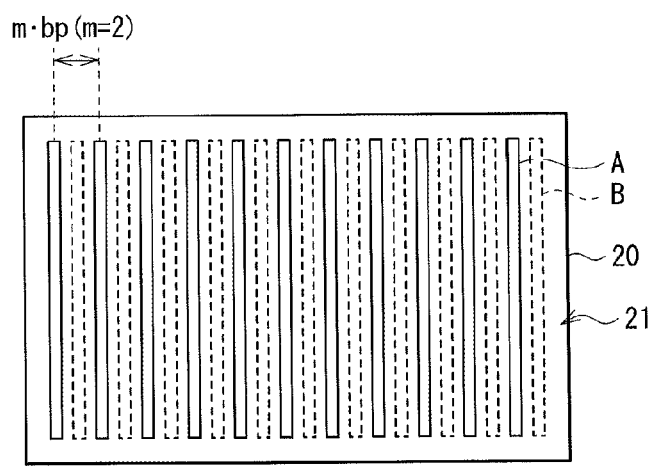
FIG. 8A A CASE WHERE OPENING SECTIONS A ARE IN A TRANSMISSION STATE
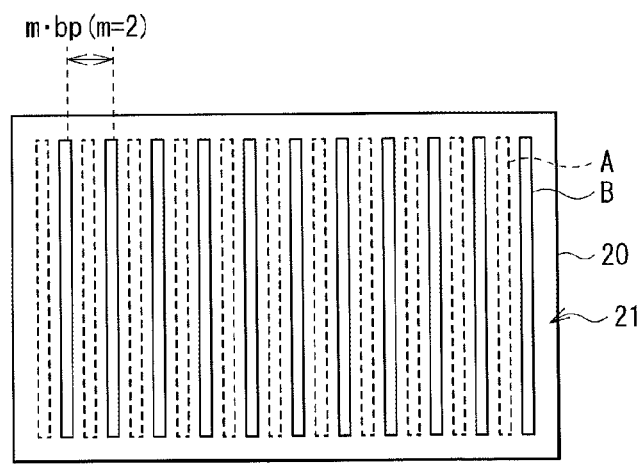
FIG. 8B A CASE WHERE OPENING SECTIONS B ARE IN A TRANSMISSION STATE

FIG. 20A  ONLY OPENING SECTIONS A

| 5 | 4 | 3 | 2 | 1 | 7 | 6 |
|---|---|---|---|---|---|---|

FIG. 20B  ONLY OPENING SECTIONS B

| 5 | 4 | 3 | 2 | 1 | 7 |
|---|---|---|---|---|---|

FIG. 20C  OPENING SECTIONS A+B

| 5 | 4+5 | 4 | 3+4 | 3 | 2+3 | 2 | 1+2 | 1 | 1+7 | 7 | 6+7 |
|---|-----|---|-----|---|-----|---|-----|---|-----|---|-----|

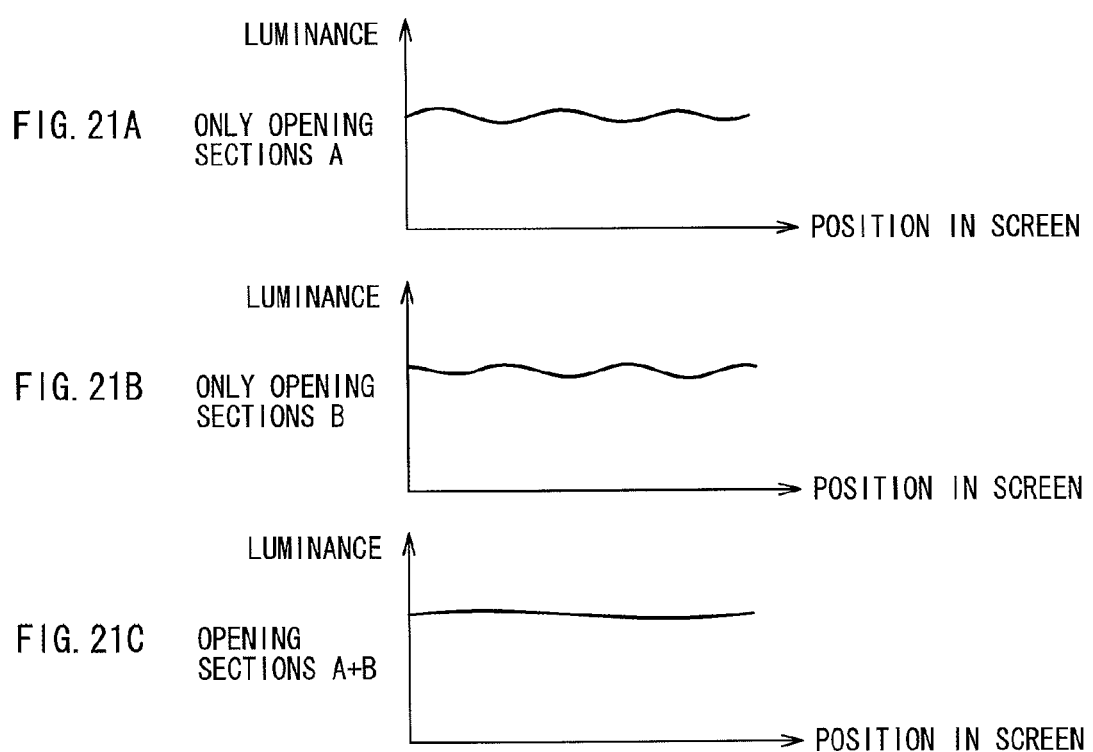

FIG. 26A  ONLY OPENING SECTIONS A
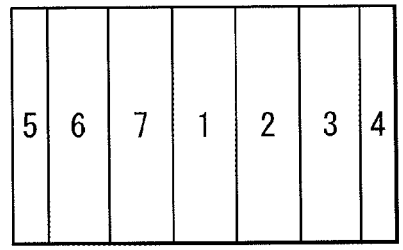
FIG. 26B  ONLY OPENING SECTIONS B
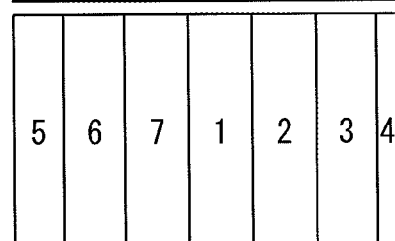
FIG. 26C  ONLY OPENING SECTIONS C
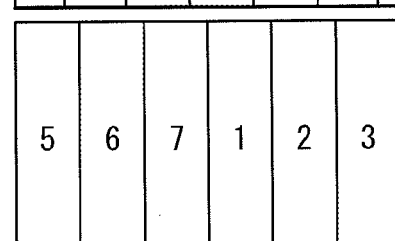
FIG. 26D  ONLY OPENING SECTIONS D
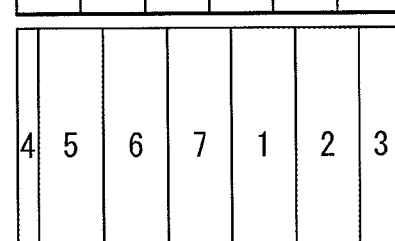
FIG. 26E  OPENING SECTIONS A+B+C+D
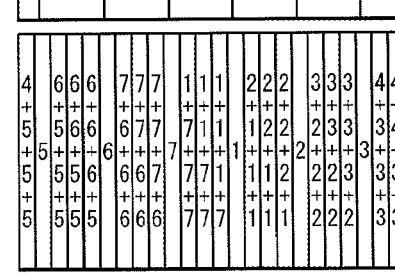

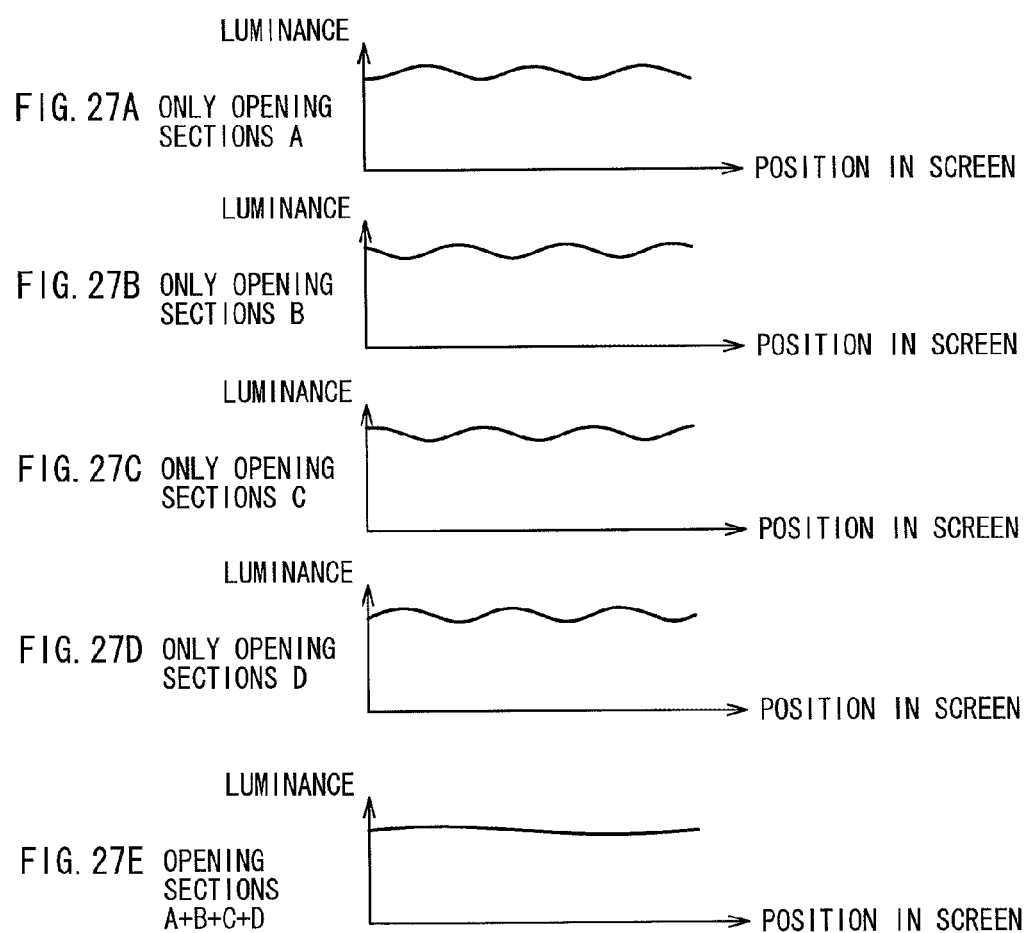

DISPLAY DEVICE AND ELECTRONIC UNIT

CROSS REFERENCE TO RELATED APPLICATIONS

The present application claims priority under 35 U.S.C. §119 to Japanese Patent Application no. JP 2011-187457, filed in the Japan Patent Office on Aug. 30, 2011, the entire contents of which are incorporated herein by reference.

BACKGROUND

The present disclosure relates to a display device that performs stereoscopic image display, and to an electronic unit that includes such a display device.

An imaging device that performs stereoscopic display perceivable with naked eyes utilizing a parallax barrier is widely known. A parallax barrier includes openings that are arranged at a certain cycle. When an image display section is viewed through the parallax barrier, different image signals enter respective right and left eyes of a viewer. Different images are viewed with his respective right and left eyes, and thereby, stereoscopic display perceivable with naked eyes is achieved.

SUMMARY

A parallax barrier scheme achieves stereoscopic display perceivable with naked eyes in a simple way. However, the parallax barrier scheme has the following issue. Namely, when the parallax barrier scheme is used with the image display section that includes a plurality of pixels which are two-dimensionally arranged to display an image, as in a display such as a liquid crystal display panel and a plasma display device, a moire phenomenon may occur. Such moire occurs due to a beat resulted from a difference between a cycle of the pixels in the image display section and a cycle of the openings in the parallax barrier. Moire is a strip pattern perceived in the displayed image due to a periodical change in luminance. Therefore, moire is known as image quality degradation which is seriously uncomfortable. Unexamined Japanese Patent Application Publication No. 2004-118140 (JP2004-118140A) discloses a technique to solve the moire.

JP2004-118140A reports that color moire is decreased when a barrier pitch (s1 or s2) and a pixel pitch (p) satisfy the following conditions.

$s1=(n+0.5)p$, where $n$ is an integer $s2=(n+k/3)p$, where $k$ equals 1 or 2

Here, p=3pp is established where pp is a sub-pixel pitch since the sub-pixels are configured of three types of sub-pixels R, G, and B.

The paragraph [0006] of JP2004-118140A discloses as follows. "Here, giving attention to the mark 41G, the columns including the marks 41G of the same color in a longitudinal direction are repeatedly formed in a lateral direction at a constant pitch of 2s1. In other words, when the expression (1) is satisfied, the cycle of color moire becomes twice of the pattern pitch s1, which is the minimum value that the color moire cycle can take. This value is sufficiently small as a pitch of moire stripes. Therefore, color moire is less likely to be perceived and a stereoscopic image with high image quality is displayed."

As disclosed in the paragraph[0008], the invention disclosed in JP2004-118140A sets the pitch of color moire to be 2s1 to solve the color moire issue. However, although the pitch of moire becomes smaller, the occurrence of moire is not fundamentally solved. Moreover, since JP2004-118140A aims to solve color moire, the moire due to luminance variation is not solved.

It is desirable to provide a display device and an electronic unit capable of achieving high-quality image display with less moire.

According to an embodiment of the disclosure, there is provided a display device including: a display section including a plurality of pixels, the display section allocating N-number of perspective images to the pixels to display the N-number of perspective images, where N is an integer representing number of the perspective images; a display drive circuit cyclically changing a correspondence relationship between the perspective images and the pixels from one to another of first to Mth states, where M is an integer representing number of the states; a plurality of selectors each selecting any from among traveling angle directions of a perspective image from the pixels; and a selector drive circuit controlling positions of the selectors to be cyclically changed from one to another of first to Mth states, the selector drive circuit operating in synchronization with the display drive circuit. A relationship 0<M<N is established, and N is a non-integer multiple of M.

According to an embodiment of the disclosure, there is provided an electronic unit including a display device, the display device including: a display section including a plurality of pixels, the display section allocating N-number of perspective images to the pixels to display the N-number of perspective images, where N is an integer representing number of the perspective images; a display drive circuit cyclically changing a correspondence relationship between the perspective images and the pixels from one to another of first to Mth states, where M is an integer representing number of the states; a plurality of selectors each selecting any from among traveling angle directions of a perspective image from the pixels; and a selector drive circuit controlling positions of the selectors to be cyclically changed from one to another of first to Mth states, the selector drive circuit operating in synchronization with the display drive circuit. A relationship 0<M<N is established, and N is a non-integer multiple of M.

In the display device and the electronic unit according to the embodiments of the disclosure, the correspondence relationship between the perspective images and the pixels is cyclically changed from one to another of the first to Mth states. Further, in synchronization with this change, the positions of the plurality of selectors are cyclically changed from one to another of the first to Mth states.

In the display device and the electronic unit according to the above-described embodiments of the disclosure, the correspondence relationship between the N-number of perspective images and the pixels are cyclically changed from one to another of the first to Mth states. In addition thereto, in synchronization with this change, the positions of the plurality of selectors are cyclically changed from one to another of the first to Mth states. Further, predetermined conditions concerning N and M are satisfied. This enables high-quality image display with less moire.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 8A is an explanatory diagram illustrating a case where only openings A are in a transmission state, and FIG. 8B is an explanatory diagram illustrating a case where only openings B are in the transmission state.

FIG. 20A is an explanatory diagram illustrating a state of the perspective images viewed from the viewing position P2 at the distance longer than the optimum viewing distance in the case where only the openings A are in the transmission state. FIG. 20B is an explanatory diagram illustrating a state of the perspective images viewed from the viewing position P2 in the case where only the openings B are in the transmission state. FIG. 20C is an explanatory diagram illustrating a state where the states of the perspective images in FIGS. 20A and 20B are superimposed.

FIG. 21A is an explanatory diagram illustrating a luminance distribution viewed from the viewing position P2 at the distance longer than the optimum viewing distance in the case where only the openings A are in the transmission state. FIG. 21B is an explanatory diagram illustrating a luminance distribution viewed from the viewing position P2 in the case where only the openings B are in the transmission state. FIG. 21C is an explanatory diagram illustrating a state where the luminance distributions in FIGS. 21A and 21B are superimposed.

FIG. 26A is an explanatory diagram illustrating a state of the perspective images viewed from the viewing position P2 at the distance longer than the optimum viewing distance in the case where only the openings A are in the transmission state. FIG. 26B is an explanatory diagram illustrating a state of the perspective images viewed from the viewing position P2 in the case where only the openings B are in the transmission state. FIG. 26C is an explanatory diagram illustrating a state of the perspective images viewed from the viewing position P2 in the case where only the openings C are in the transmission state. FIG. 26D is an explanatory diagram illustrating a state of the perspective images viewed from the viewing position P2 in the case where only the openings D are in the transmission state. FIG. 26E is an explanatory diagram illustrating a state where the states of the perspective images in FIGS. 26A to 26D are superimposed.

FIG. 27A is an explanatory diagram illustrating a luminance distribution viewed from the viewing position P2 at the distance longer than the optimum viewing distance in the case where only the openings A are in the transmission state. FIG. 27B is an explanatory diagram illustrating a luminance distribution viewed from the viewing position P2 in the case where only the openings B are in the transmission state. FIG. 27C is an explanatory diagram illustrating a luminance distribution viewed from the viewing position P2 in the case where only the openings C are in the transmission state. FIG. 27D is an explanatory diagram illustrating a luminance distribution viewed from the viewing position P2 in the case where only the openings D are in the transmission state. FIG. 27E is an explanatory diagram illustrating a state where the luminance distributions in FIGS. 27A to 27D are superimposed.

DETAILED DESCRIPTION

Hereinafter, embodiments of the present disclosure will be described in detail with reference to drawings.
[First Embodiment]
[General Configuration of Display Device]

Figure 1:
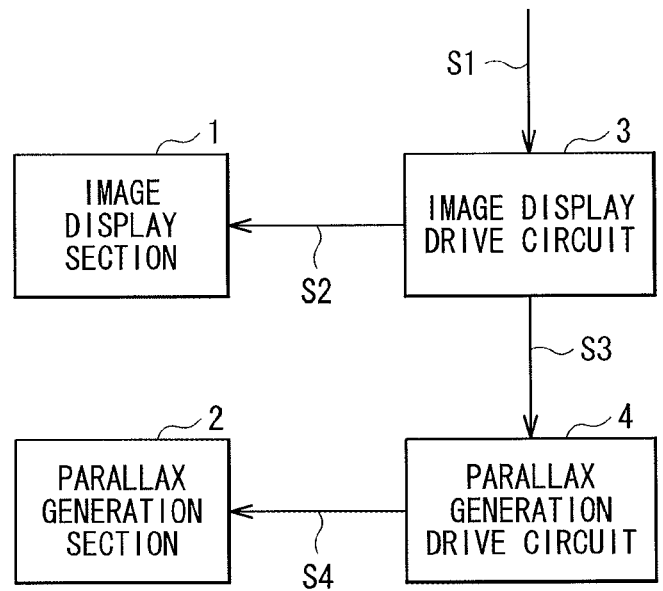
FIG. 1 is a block diagram illustrating a configuration example of a display device according to a first embodiment of the present disclosure.

FIG. 1 illustrates a configuration example of a display device according to a first embodiment of the present disclosure. The display device includes an image display section 1, a parallax generation section 2, an image display drive circuit 3, and a parallax generation drive circuit 4.

The image display drive circuit 3 receives parallax image signals S1 from the outside of the device. The parallax image signals S1 are image signals having different parallaxes according to the depth of the stereoscopic information of a stereoscopic image to be reproduced. The parallax image signals S1 according to the number of perspectives described later is supplied. The image display drive circuit 3 changes the arrangement of the parallax image signals S1 to generate an image signal S2. The image display drive circuit 3 supplies the image signal S2 to the image display section 1. The image display drive circuit 3 also supplies a synchronization signal S3 corresponding to the outputted image signal S2 to the parallax generation drive circuit 4. The parallax generation drive circuit 4 supplies, according to the synchronization signal S3, to the parallax generation section 2 a parallax generation signal S4 corresponding to the image signal S2 which is to be displayed by the image display section 1, thereby driving the parallax generation section 2. The parallax generation section 2 operates according to the parallax generation signal S4.

[Configuration Example of Image Display Section 1 and Parallax Generation Section 2]

Figure 2:
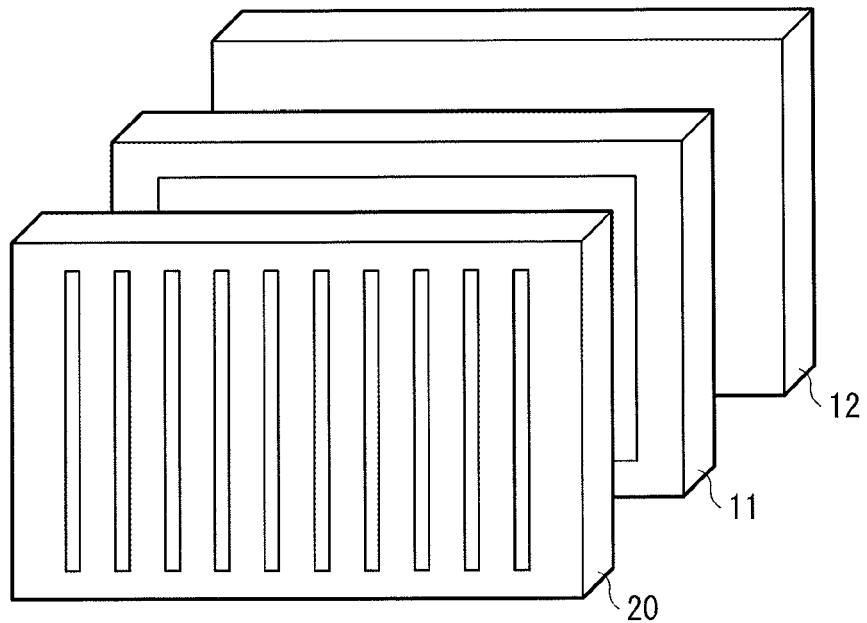
FIG. 2 is an appearance perspective view illustrating a configuration example of an image display section and a parallax generation section.
Figure 3:
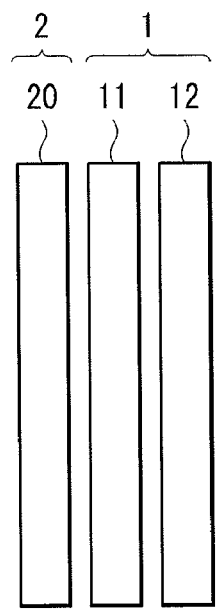
FIG. 3 is a side view illustrating the configuration example of the image display section and the parallax generation section.

FIGS. 2 and 3 illustrate a configuration example of the image display section 1 and the parallax generation section 2. The image display section 1 displays an image on a two-dimensional plane. FIGS. 2 and 3 show the configuration example in which the image display section 1 is configured of a combination of a liquid crystal panel 11 and a backlight 12. However, this is not limitative and, for example, the image display section 1 may be configured of an electroluminescence panel and/or the like. The parallax generation section 2 is arranged between the image display section 1 and a viewer. Thus, light emitted from the image display section 1 enters the parallax generation section 2. The parallax generation section 2 is configured of a parallax barrier (liquid crystal barrier 20) that controls light transmittance utilizing a liquid crystal material.

Figure 4:
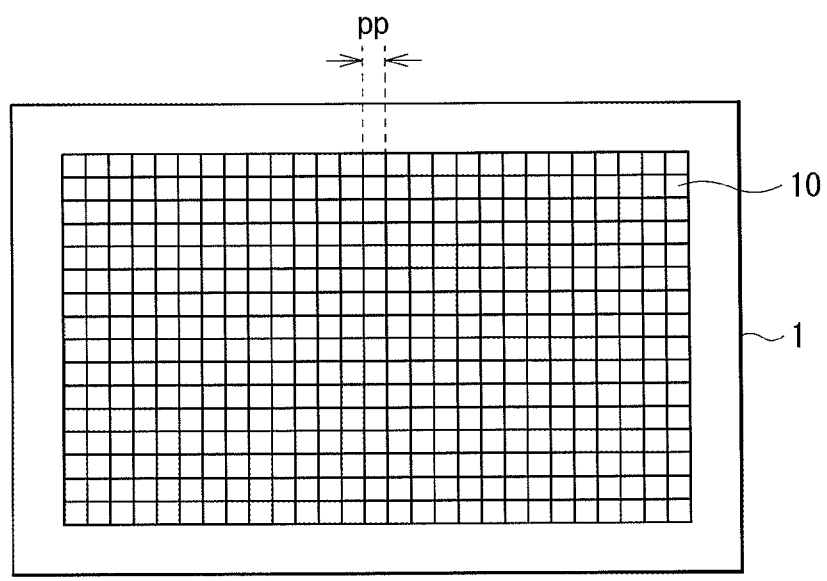
FIG. 4 is a plan view illustrating a configuration example of the image display section.

The image display section 1 includes a plurality of pixels 10 arranged on a two-dimensional plane as shown in FIG. 4. The luminance of each pixel 10 is changed on an individual basis and each pixel 10 displays an image on an optional basis. Each pixel 10 displays an image in accordance with the image signal S2 inputted from the image display drive circuit 3 (FIG. 1). A pitch of the pixels 10 in a horizontal direction (horizontal pixel pitch) is represented by pp.

Figure 5:
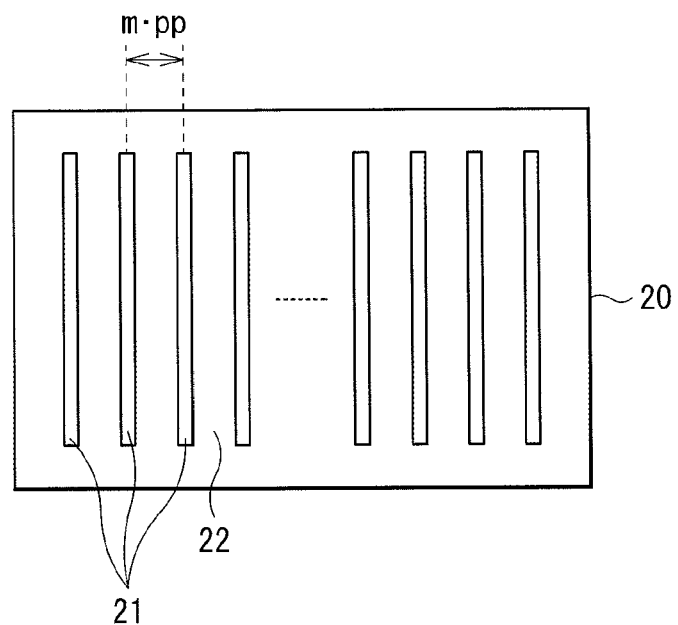
FIG. 5 is a plan view illustrating a configuration example of the parallax generation section (liquid crystal barrier).
Figure 6:
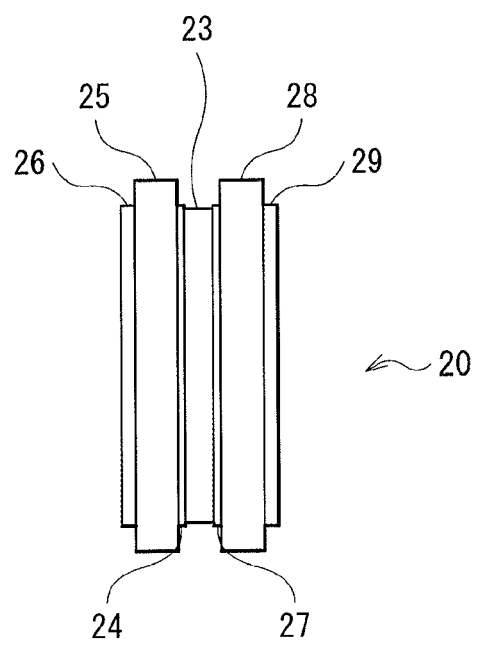
FIG. 6 is a side view illustrating a configuration example of the parallax generation section (liquid crystal barrier).

FIGS. 5 and 6 illustrate a specific configuration example of the liquid crystal barrier 20 corresponding to the parallax generation section 2. As shown in FIG. 5, the liquid crystal barrier 20 includes a plurality of slit-like openings 21 extending in a vertical direction. The spaces between the openings 21 are configured to be shielding sections 22 which do not transmit light. The openings 21 each function as an traveling angle direction selector that selects light of each perspective image from each pixel 10 of the image display section 1 to be emitted. The openings 21 each select the traveling angle direction of each perspective image directed to the viewer according to a positional relationship between the pixels 10 and the openings 21. Details thereof will be described later.

As shown in FIG. 6, the liquid crystal barrier 20 includes a liquid crystal material 23, a first transparent electrode 24, a first transparent parallel plate 25, a first polarizer 26, a second transparent electrode 27, a second transparent parallel plate 28, and a second polarizer 29.

The liquid crystal material 23 is sealed between the first transparent parallel plate 25 and the second transparent parallel plate 28. The first transparent electrode 24 configured of a material such as ITO (Indium Tin Oxide) is provided on a surface closer to the liquid crystal material 23 of the first transparent parallel plate 25. Similarly, the second transparent electrode 27 is provided on a surface closer to the liquid crystal material 23 of the second transparent parallel plate 28. In the liquid crystal barrier 20, the alignment of the liquid crystal material 23 varies according to a voltage applied to the first transparent electrode 24 and the second transparent electrode 27. Light emitted from the image display section 1 is linearly polarized when the light passes through the polarizer 26. The polarization of the light is controlled by the alignment of the liquid crystal material 23 when the light passes through the liquid crystal material 23. Further, the intensity of the light is modulated when the light passes through the second polarizer 29. For example, the liquid crystal barrier 20 may operate in a so-called normally-black mode in which light is transmitted when a voltage is applied and light is shielded when a voltage is not applied. Alternatively, the liquid crystal barrier 20 may operate in a so-called normally-white mode in which light is shielded when a voltage is applied and light is transmitted when a voltage is not applied. It is to be noted that the shielded light is absorbed by the second polarizer 29 when the second polarizer 29 is an absorptive polarizer and the shielded light turns back to the image display section 1 when the second polarizer 29 is a reflective polarizer.

[Operation of Display Device]

In the display device, the image display section 1 allocates N-number of (N is an integer representing the number of the perspective images) perspective images to the pixels 10 and displays the perspective images. The image display drive circuit 3 cyclically changes a correspondence relationship between the perspective images and the pixels 10 from one to another of first to Mth (M is an integer representing the number of states) states. The plurality of traveling angle direction selectors (openings 21) each select a traveling angle direction of a perspective image from the pixels 10. The parallax generation drive circuit 4 cyclically changes positions of the plurality of traveling angle direction selectors from one to another of first to Mth states in synchronization with the image display drive circuit 3. In addition, parameters N and M are set to satisfy a relationship 0<M<N and to allow N to be a non-integer multiple of M as described in a specific example below.

The parallax generation drive circuit 4 changes the positions of the plurality of openings 21 to allow the traveling angle directions of the perspective images of the same perspective to be different from each other between any two of the first to Mth states. The parallax generation drive circuit 4 also changes the positions of openings 21 to allow the position relationship between the openings 21 and the pixels 10 corresponding to the perspective images of the same perspective to be different from each other between any two of the first to Mth states.

An operation example of the plurality of openings 21 of the liquid crystal barrier 20 will be described with reference to FIGS. 7, 8A, and 8B. The pitches between adjacent openings 21 are the same, and here, are represented by bp. The slit-like openings 21 may be alternately grouped into two groups, i.e., a group of openings A (opening group A) and a group of openings B (opening group B).

Figure 7:
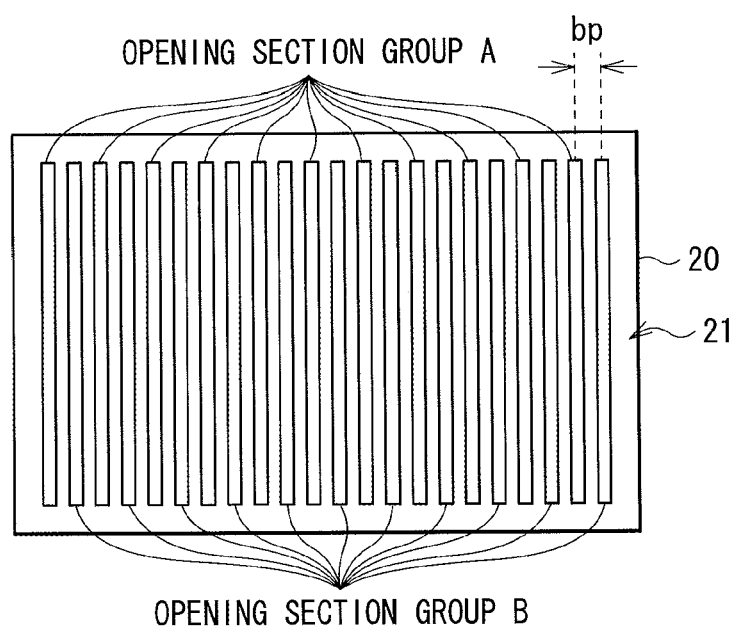
FIG. 7 is an explanatory diagram illustrating grouping of openings in the liquid crystal barrier.

In FIG. 7, the odd-numbered openings 21 counted from the left belong to the opening group A and the even-numbered openings 21 counted from the left belong to the opening group B. All of the openings 21 belonging to the opening group A are operated with the same light switching and all of the openings 21 belonging to the opening group B are operated with another same light switching. Specifically, for example, only the opening group A is allowed to be operated to be in an open state (transmission state) while the opening group B is operated to be in the light-shielding state (non-transmission state), or conversely, only the opening group B is allowed to be operated to be in the open state (transmission state) while the opening group A is operated to be in the light-shielding state (non-transmission state).

FIG. 8A illustrates a case where only the opening group A is in the transmission state and FIG. 8B illustrates a case where only the opening group B is in the transmission state. Since the openings 21 are grouped into two groups, a pitch between the adjacent openings 21 that belong to the same group is defined as 2×bp. The number of the groups of the openings 21 is two (M=2) in FIGS. 7, 8A, and 8B. However, the number of the groups may be three or four, or more (M=3, 4, or more) as described later in a modification example (FIGS. 22 to 25).

Figure 9:
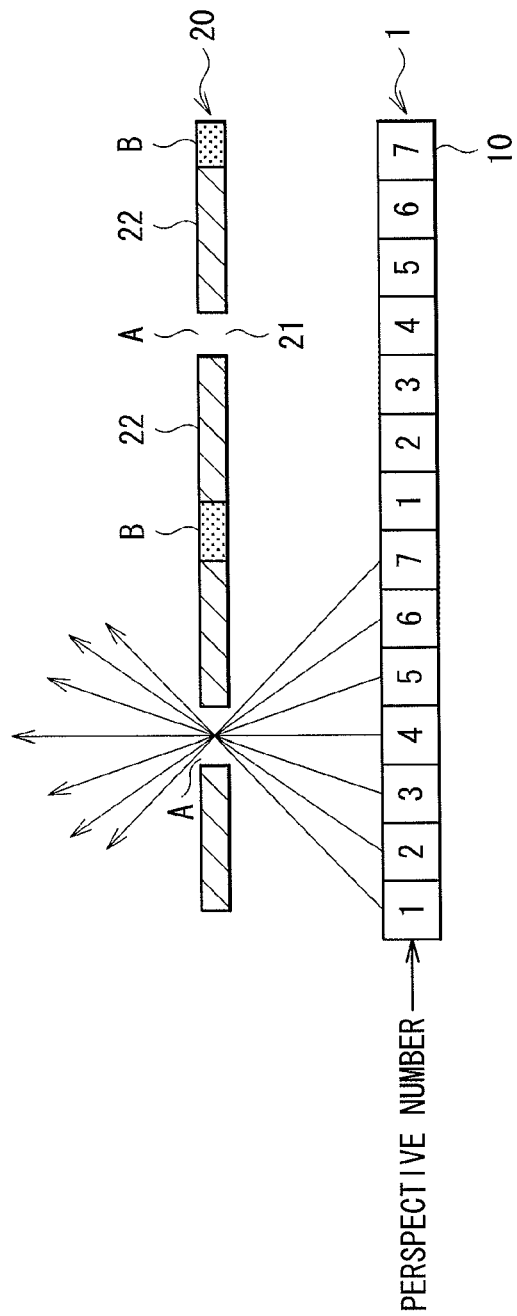
FIG. 9 is an explanatory diagram illustrating a principle of stereoscopic display.

One principle to achieve a stereoscopic display will be described below with reference to FIG. 9. FIG. 9 corresponds to a cross-section of FIG. 2. The opening group A is in the transmission state and the opening group B is in the light-shielding state. The traveling angle directions of light emitted from respective pixels 10 of the image display section 1 are selected by the opening group A of the liquid crystal barrier 20. The opening group A is so configured that one opening A is provided for every seven pixels in FIG. 9. Each of the numbers 1 to 7 assigned to each pixel 10 represents a perspective number in stereoscopic display. The pixels 10 assigned with the same perspective number display the corresponding perspective image. The openings 21 in the transmission state of the liquid crystal barrier 20 select the traveling angle directions of the perspective images to allow different perspective images to enter the respective left and right eyes of a viewer. This enables stereoscopic display.

Figure 10:
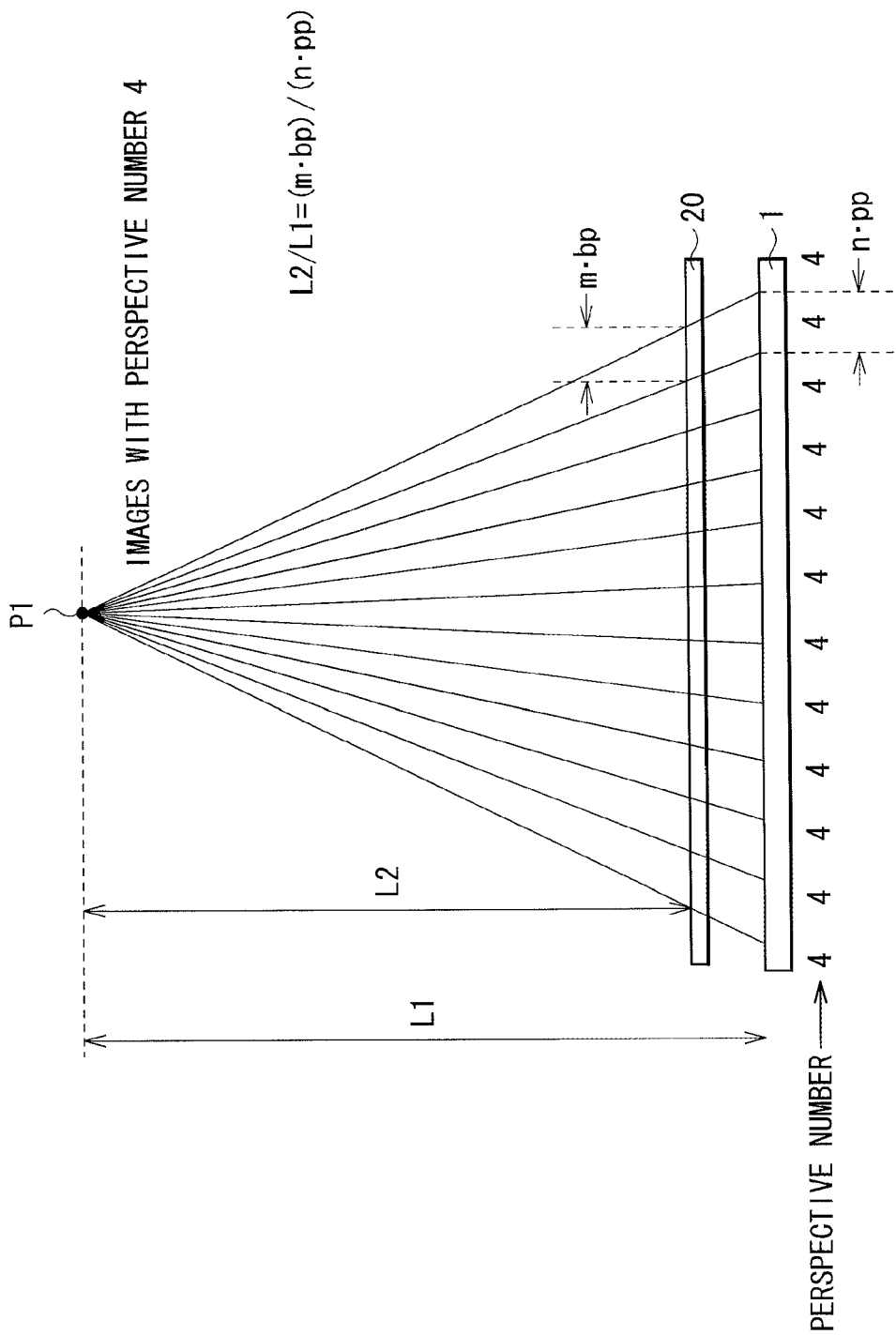
FIG. 10 is an explanatory diagram illustrating a relationship between a pitch of the openings and a pitch of pixels.

FIG. 10 illustrates a relationship between the number M of the opening groups in the liquid crystal barrier 20, the pitch by of the opening groups, the number N of the perspectives, and the pitch pp of the pixels 10 in the image display section 1. At a distance L2 (optimum viewing distance) from the liquid crystal barrier 20, the same perspective images are concentrated on a light-concentrated position P1 from the entire image display section 1. The example in FIG. 10 illustrates a light-concentrated state of the perspective images assigned with the perspective number 4. When the viewer is at the distance L2 from the liquid crystal barrier 20, the viewer sees a single perspective image with each eye over the entire image display section 1. Different perspective images enter his respective right and left eyes. Therefore, stereoscopic display is performed.

The openings belonging to the same opening group allow the same perspective images to be concentrated on a single point at the optimum viewing distance L2. Therefore, the value of N·pp which is obtained by multiplying the number N of the perspectives by the pixel pitch pp in the image display section 1 differs from the value of the pitch M·bp of the openings belonging to the same opening group. The value of N·pp is larger than that of M·bp. When L1 represents the sum of the optimum viewing distance L2 and the distance between the liquid crystal barrier 20 and the image display section 1, the following expression holds.

$$L2/L1=(M \cdot bp)/(N \cdot pp)$$

Figure 11:
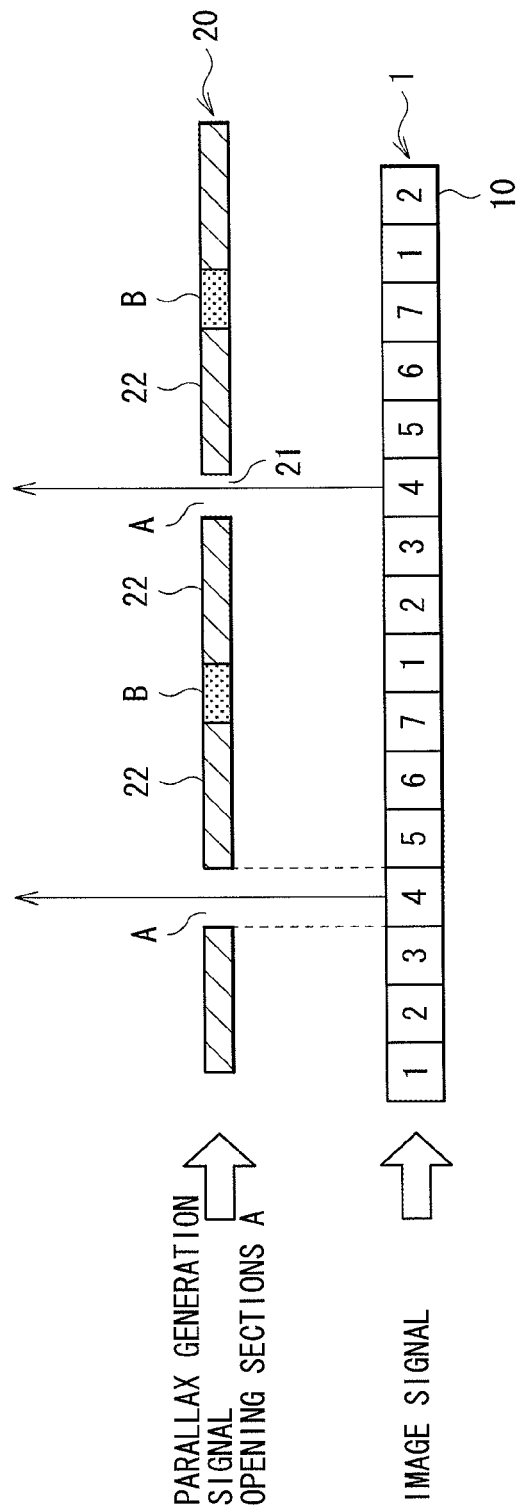
FIG. 11 is an explanatory diagram illustrating a relationship between the openings A and perspective images in the case where only the openings A are in the transmission state.
Figure 12:
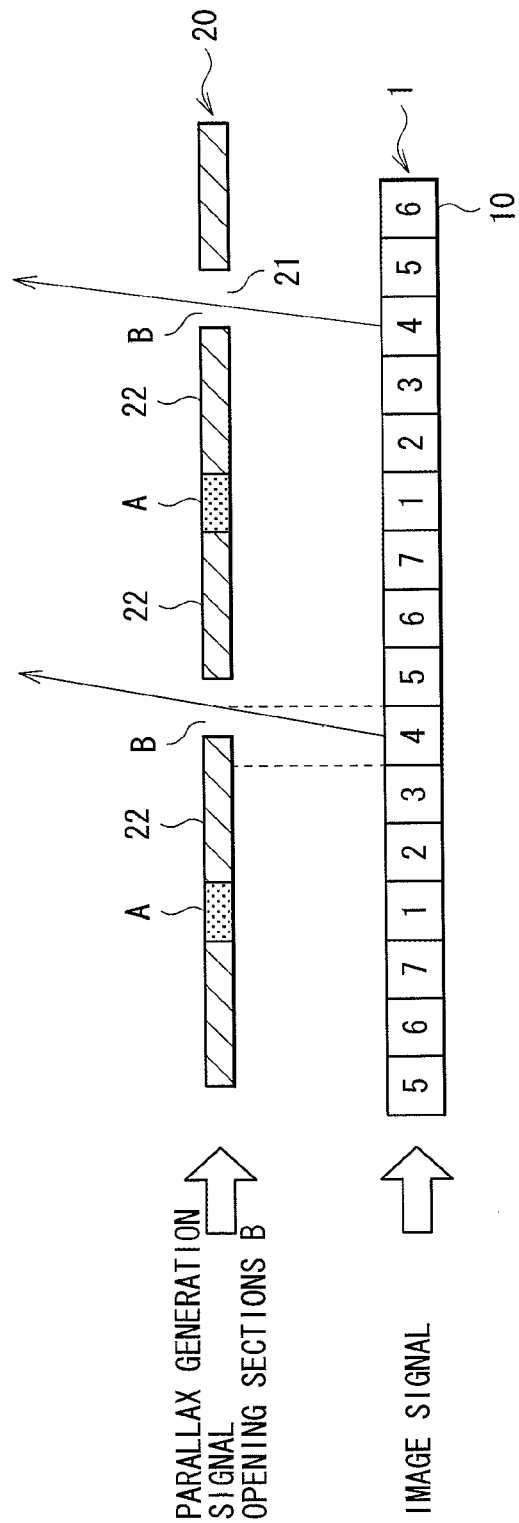
FIG. 12 is an explanatory diagram illustrating a relationship between the openings B and the perspective images in the case where only the openings B are in the transmission state.

It is one of the features of the display device that the number N of the perspectives is a non-integer multiple of the number M of the opening groups. The condition N=7, M=2 used in the above description satisfies this relationship. FIG. 11 illustrates the relationship between the openings A and the perspective images in the case where the opening group A is in the transmission state and the opening group B is in the shielding state. FIG. 12 illustrates the relationship between the openings B and the perspective images in the case where the opening group B is in the transmission state and the opening group A is in the shielding state. Since N is not an integral multiple of M, the position relationship of the pixels 10 and the openings 21 in the transmission state is shifted between the case where the opening group A is in the transmission state and the case where the opening group B is in the transmission state. In FIG. 11, each opening A of the opening group A in the transmission state is at a position almost vertically above each pixel assigned with the perspective number 4. However, in FIG. 12, each opening B of the opening group B in the transmission state is not at the position almost vertically above each pixel assigned with the perspective number 4. Therefore, the traveling angle directions of the perspective images of the same perspective are shifted between the case where the opening group A is in the transmission state and the case where the opening group B is in the transmission state.

Figure 13:
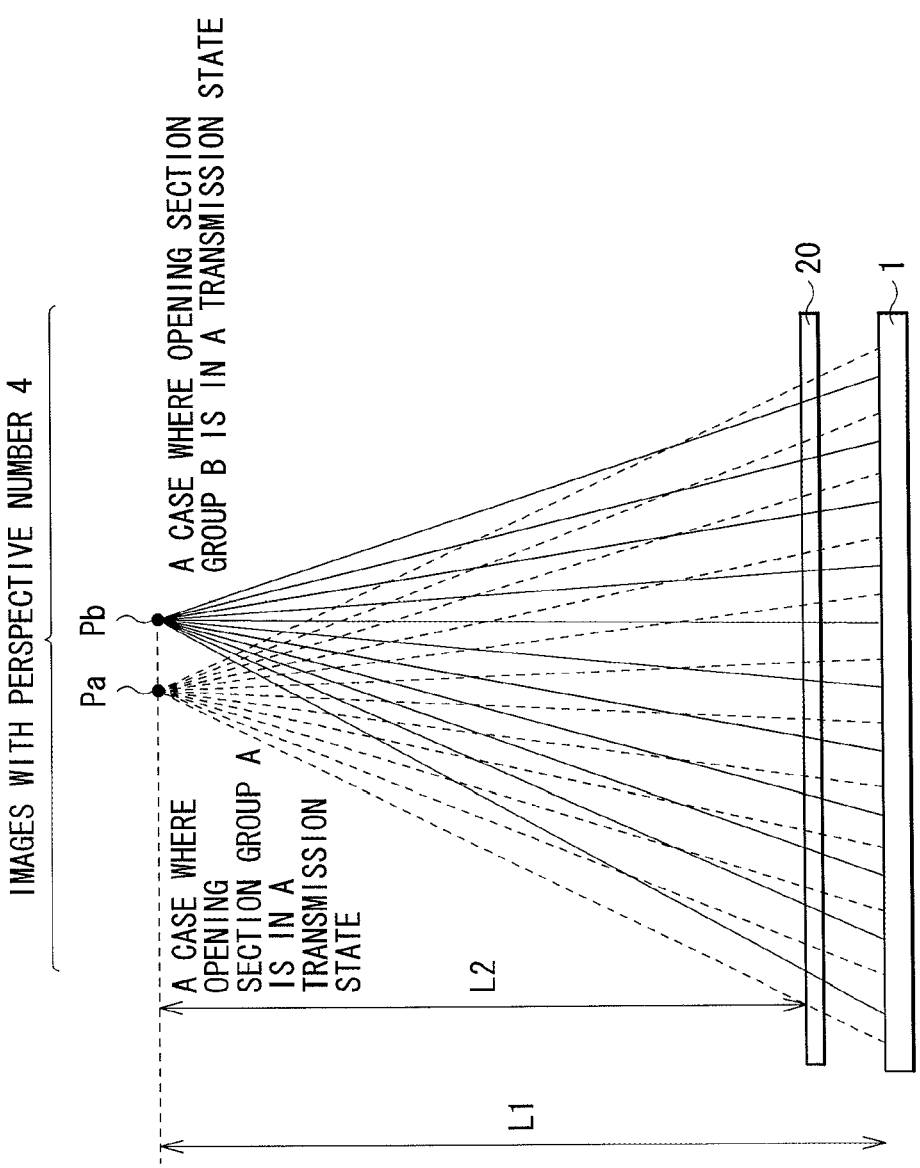
FIG. 13 is an explanatory diagram illustrating a light-concentrated state of light beams in the case where the openings A are in the transmission state and a light-concentrated state of the light beams in the case where the openings B are in the transmission state.

FIG. 13 illustrates a state of light beams of the perspective images assigned with the perspective number 4 being concentrated on a position at the optimum viewing distance L2 for each of the cases where the opening group A is in the transmission state and where the opening group B is in the transmission state. The position, at the distance L2 from the liquid crystal barrier 20, on which the light beams of the images of the same perspective is concentrated is shifted between the case where the opening group A is in the transmission state and the case where the opening group B is in the transmission state. The light beams are concentrated on a position Pa in the case where the opening group A is in the transmission state, and the light beams are concentrated on a position Pb in the case where the opening group B is in the transmission state. It is to be noted that the shift amount between the positions Pa and Pb at the optimum viewing distance L2 is set to an extent that the perception of stereoscopic display is not affected thereby.

[Principle of Decreasing Moire]

Figure 14:
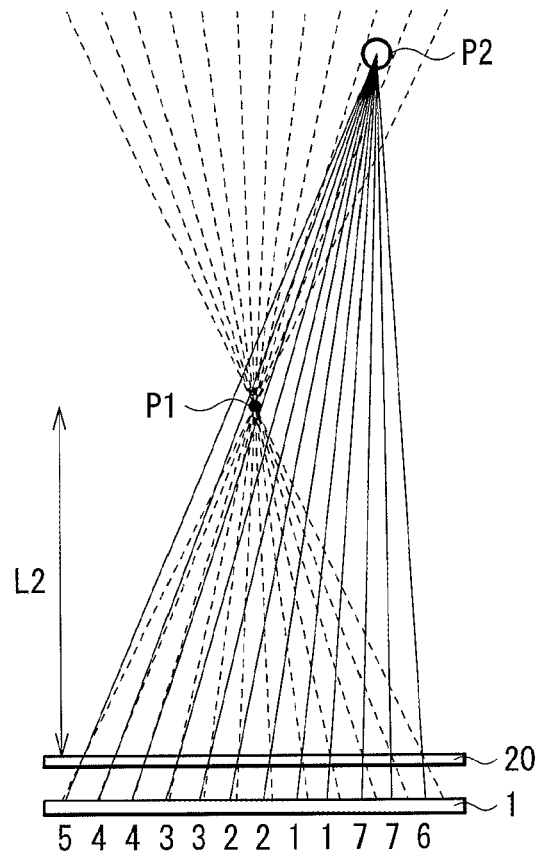
FIG. 14 is an explanatory diagram illustrating occurrence of moire.
Figure 15:
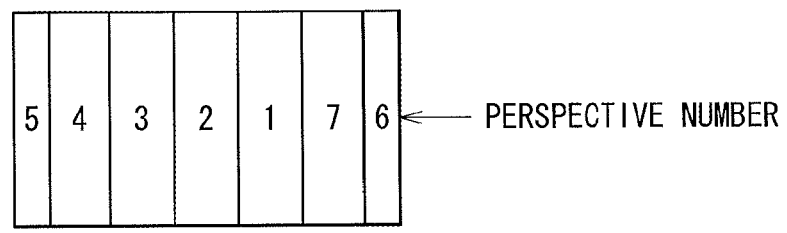
FIG. 15 is an explanatory diagram illustrating a state of the perspective images viewed from a viewing position P2 at a distance longer than an optimum viewing distance.

Moire is decreased by performing a display operation shown in FIGS. 11 to 13. One principle thereof will be described below. In the related art, moire is easily perceived when an image is viewed at a distance other than the optimum viewing distance L2. For example, as shown in FIG. 14, when the viewing position P2 is at a distance longer than the optimum viewing distance L2, the plurality of perspective images are partially viewed with one eye of the viewer as shown in FIG. 15, for example. The plurality of perspective images are mixed at the boundary thereof. For example, the perspective image 3 is overlaid on the perspective image 2 near the boundary of the perspective images 2 and 3. Therefore, the luminance thereof does not stay at a constant level. Accordingly, moire occurs in the related art, resulting in image quality degradation due to luminance unevenness.

Figure 16:
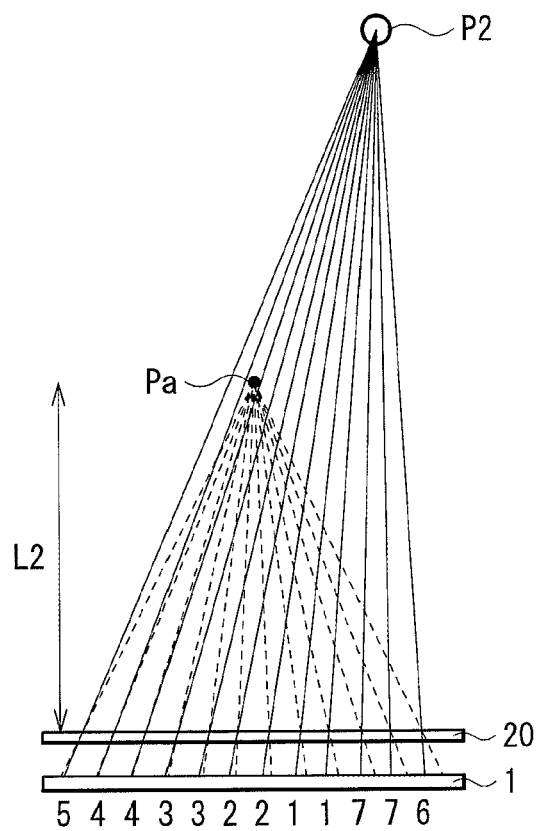
FIG. 16 is an explanatory diagram illustrating a light-concentrated state of the light beams in the case where only the openings A are in the transmission state.
Figure 17:
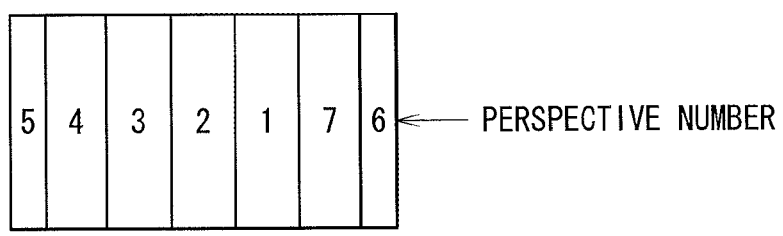
FIG. 17 is an explanatory diagram illustrating a state of the perspective images viewed from the viewing position P2 at the distance longer than the optimum viewing distance in the case where only the openings A are in the transmission state.
Figure 18:
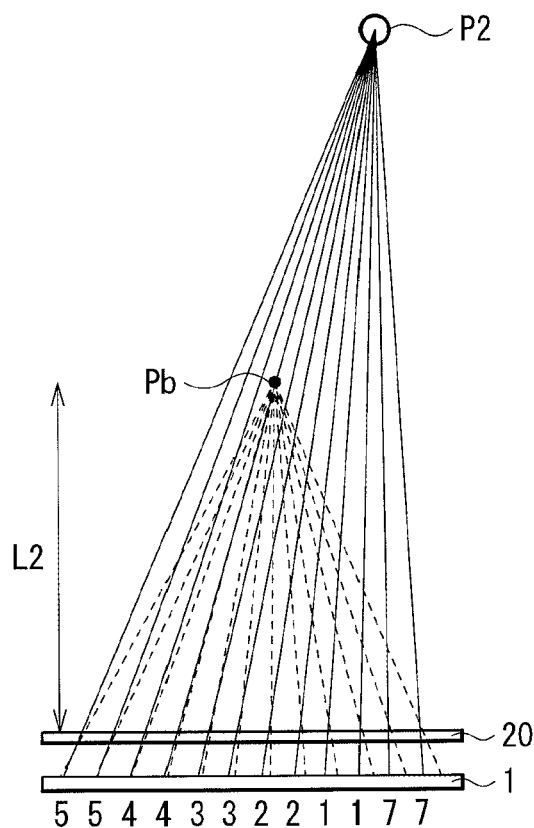
FIG. 18 is an explanatory diagram illustrating a light-concentrated state of the light beams in the case where only the openings B are in the transmission state.
Figure 19:
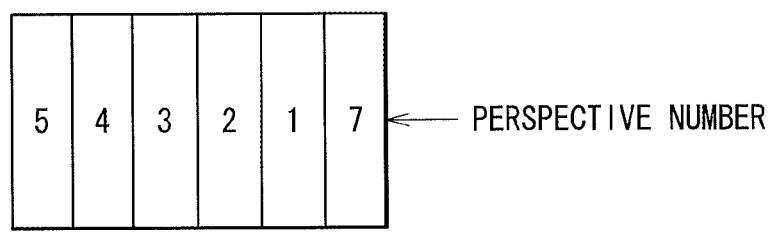
FIG. 19 is an explanatory diagram illustrating a state of the perspective images viewed from the viewing position P2 at the distance longer than the optimum viewing distance in the case where only the openings B are in the transmission state.

In the present embodiment, the plurality of opening groups are switched at high speed to decrease moire. FIG. 16 illustrates a light-concentrated state of the light beams in the case where only the opening group A is in the transmission state and FIG. 17 illustrates a state of the perspective images viewed from the viewing position P2 at the distance longer than the optimum viewing distance L2 in the case where only the opening group A is in the transmission state. FIG. 18 illustrates a light-concentrated state of the light beams in the case where only the opening group B is in the transmission state and FIG. 19 illustrates a state of the perspective images viewed from the viewing position P2 at the distance longer than the optimum viewing distance L2 in the case where only the opening group B is in the transmission state.

The traveling angle directions of the light beams of the same perspective image are shifted depending on the opening group to be in the transmission state as shown in FIGS. 11 to 13. Therefore, the position of the perspective image in the image on the screen to be viewed by one eye of the viewer temporally varies. In the case where the opening group A is in the transmission state, the perspective images 6, 7, 1, 2, and so on are arranged in this order from the right as shown in FIG. 17. On the other hand, in the case where the opening group B is in the transmission state, the perspective images 7, 1, 2, 3, and so on are arranged in this order as shown in FIG. 19. Switching between these two cases, for example, at the interval of 1/120 seconds allows the viewer to perceive an integrated image. FIG. 20C illustrates the integrated image perceived by one eye of the viewer. FIG. 20A illustrates, as with FIG. 17, the state of the perspective images viewed from the viewing position P2 at the distance longer than the optimum viewing distance L2 in the case where only the opening group A is in the transmission state. FIG. 20B illustrates the state of the perspective images viewed from the viewing position P2 in the case where only the opening group B is in the transmission state. FIG. 20C illustrates a state where the state of the perspective images in FIG. 20A and the state of the perspective images in FIG. 20B are superimposed.

A luminance unevenness state in the case where only the opening group A is in the transmission state and a luminance unevenness state in the case where only the opening group B is in the transmission state are also integrated by viewing the integrated image as shown in FIG. 20C. FIGS. 21A to 21C illustrate this luminance unevenness integration. FIG. 21A illustrates a luminance distribution viewed from the viewing position P2 at the distance longer than the optimum viewing distance L2 in the case where only the opening group A is in the transmission state. FIG. 21B illustrates a luminance distribution viewed from the viewing position P2 in the case where only the opening group B is in the transmission state. FIG. 21C illustrates a state where the luminance distribution in FIG. 21A and the luminance distribution in FIG. 21B are superimposed. The positions of the openings 21 to be in the transmission state are shifted, and thereby, the boundaries of the perspective images are shifted. Therefore, the position of the luminance unevenness is changed. However, when these two states are integrated at high speed, the luminance unevenness is decreased.

Thus, moire caused by luminance unevenness is improved, and thereby, the image quality is improved. In the above description, the opening group to be in the transmission state is switched at high speed. In this regard, flicker is less likely to be perceived when this speed is faster than the response speed of human eyes, for example, when the opening group to be in the transmission state is switched at a speed faster than 1/25 seconds.

[Effects]

As described above, according to the display device of the present embodiment, the correspondence relationship between the N-number of perspective images and the pixels 10 is cyclically changed from one to another of the first to Mth states, while, in synchronization with this change, the positions of the plurality of selectors (openings 21) are cyclically changed from one to another of the first to Mth states. In addition thereto, N and M are set to satisfy the predetermined conditions. Therefore, high-quality image display with less moire is achieved. In particular, moire caused by luminance variation is decreased in addition to color moire.

[Modification Example of First Embodiment]

In the above-described embodiment, the case where N=7 and M=2 is described as an example. However, N and M may be other values as long as the condition of 0<M<N and the condition of N being a non-integer multiple of M are satisfied.

Figure 22:
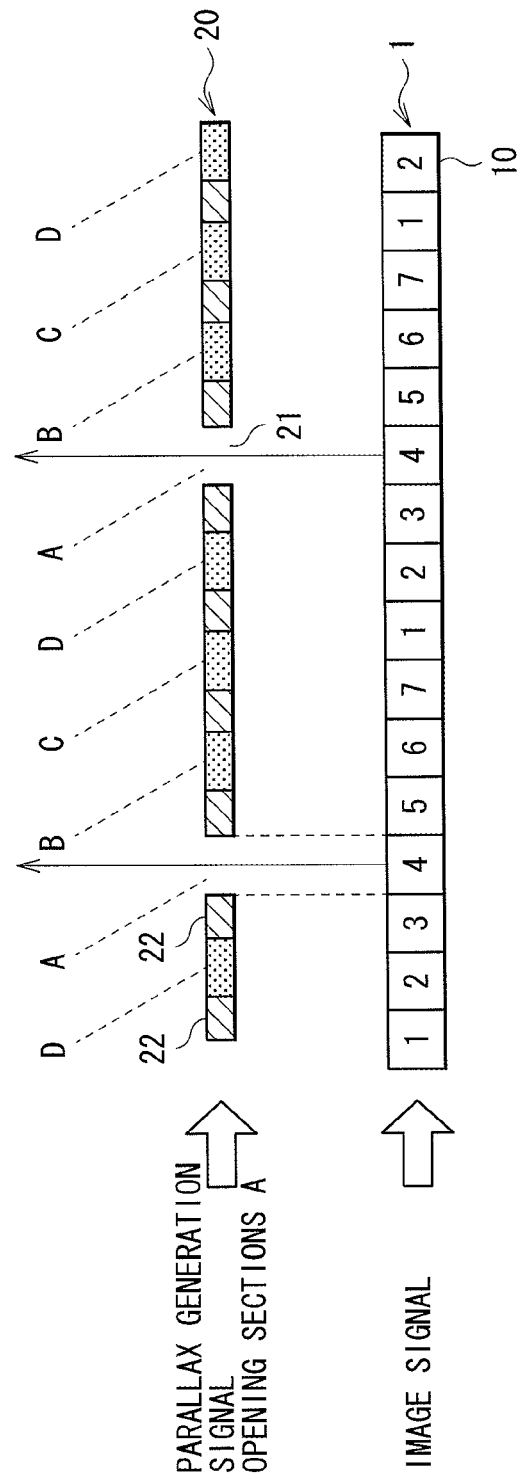
FIG. 22 is an explanatory diagram illustrating the relationship between the openings A and the perspective images in the case where only the openings A are in the transmission state in a modification example in which the openings are grouped into four groups of A to D.
Figure 23:
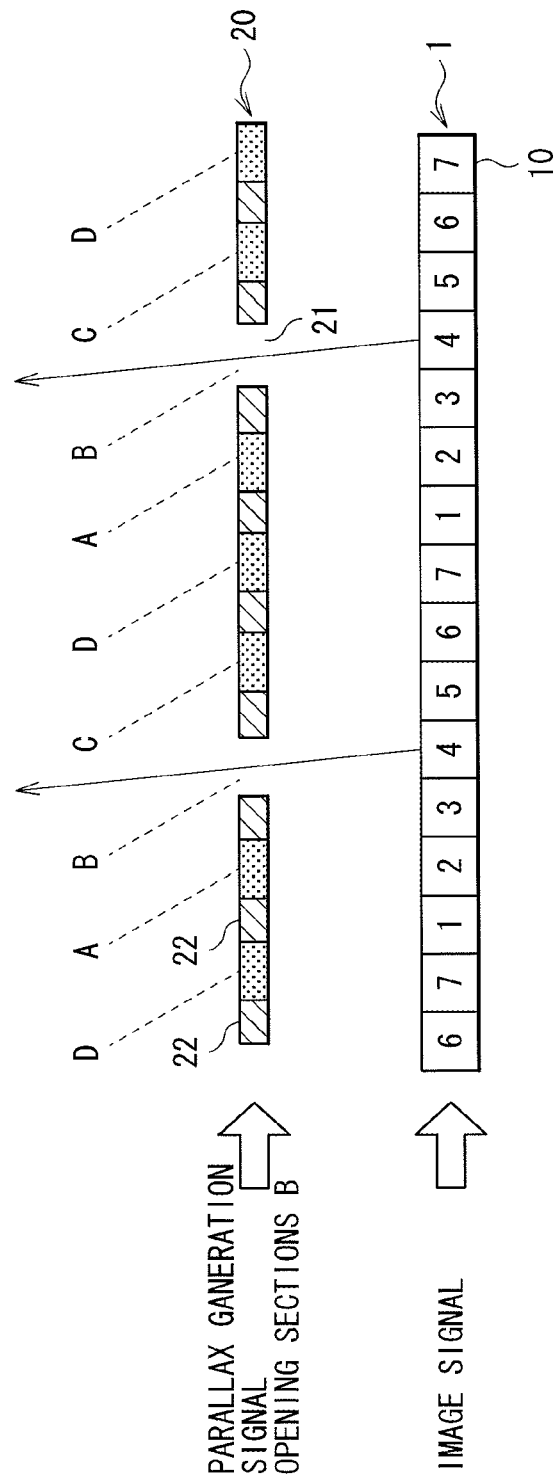
FIG. 23 is an explanatory diagram illustrating the relationship between the openings B and the perspective images in the case where only the openings B are in the transmission state in the modification example in which the openings are grouped into the four groups of A to D.
Figure 24:
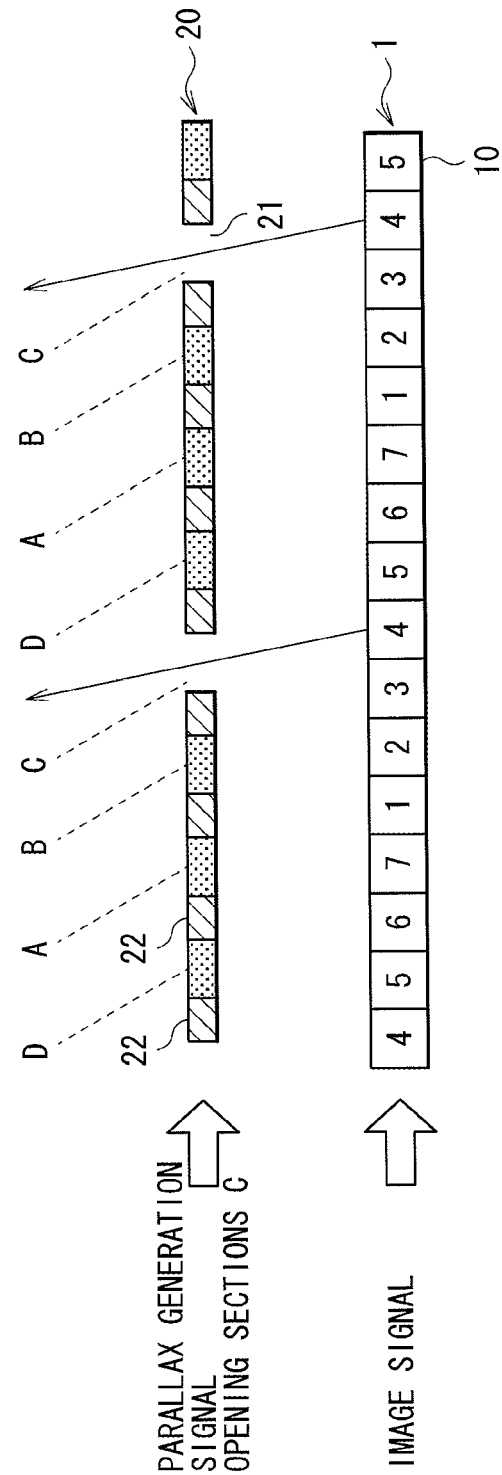
FIG. 24 is an explanatory diagram illustrating a relationship between openings C and the perspective images in a case where only the openings C are in the transmission state in the modification example in which the openings are grouped into the four groups of A to D.
Figure 25:
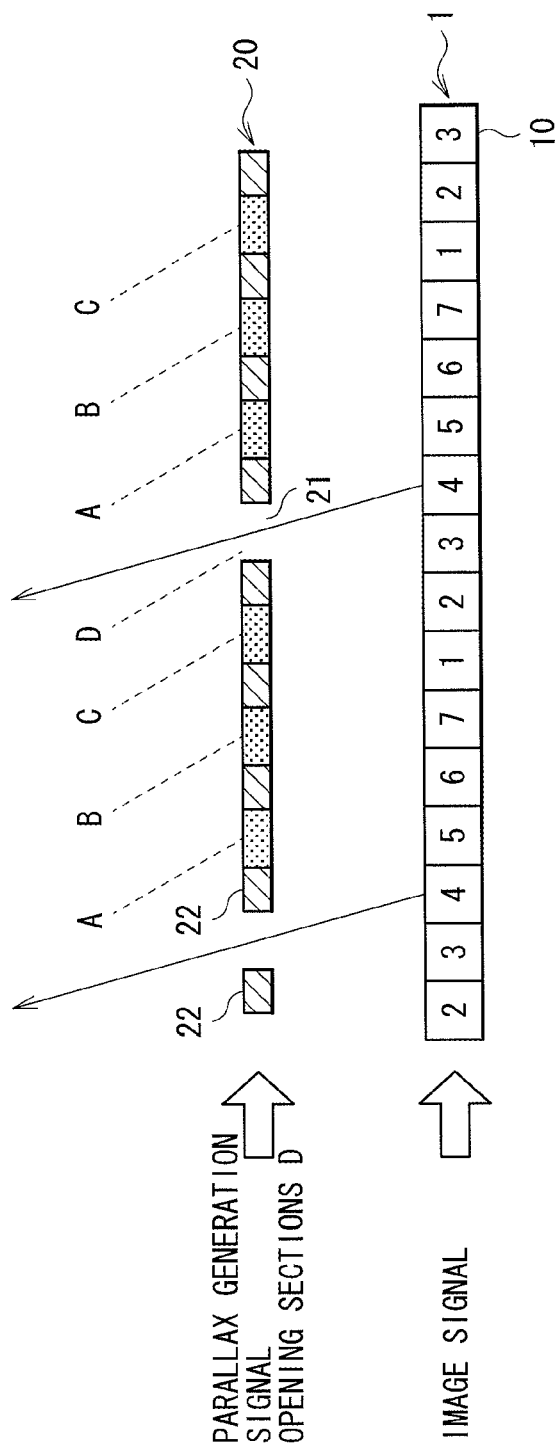
FIG. 25 is an explanatory diagram illustrating a relationship between openings D and the perspective images in a case where only the openings D are in the transmission state in the modification example in which the openings are grouped into the four groups of A to D.

In the present modification example, the case where N=7 and M=4 will be described. Since M=4, the plurality of openings 21 of the liquid crystal barrier 20 are grouped in to four groups of A, B, C, and D to be operated. FIGS. 22 to 25 illustrate the relationship between the openings 21 in each group and the perspective images. FIG. 22 illustrates a case where only the opening group A is in the transmission state, FIG. 23 illustrates a case where only the opening group B is in the transmission state, FIG. 24 illustrates a case where only the opening group C is in the transmission state, and FIG. 25 illustrates a case where only the opening group D is in the transmission state. The position relationship between the pixels 10 and the openings 21 in the transmission state is shifted depending on which opening group is in the transmission state also in this modification example. The traveling angle directions of the perspective images of the same perspectives are also shifted depending on which opening group is in the transmission state. Therefore, moire is improved.

FIG. 26A illustrates a state of the perspective images viewed from the viewing position P2 at the distance longer than the optimum viewing distance L2 (FIG. 14) in the case where only the opening group A is in the transmission state (FIG. 22). FIG. 26B illustrates a state of the perspective images viewed from the viewing position P2 in the case where only the opening group B is in the transmission state (FIG. 23). FIG. 26C illustrates a state of the perspective images viewed from the viewing position P2 in the case where only the opening group C is in the transmission state (FIG. 24). FIG. 26D illustrates the state of the perspective images viewed from the viewing position P2 in the case where only the opening group D is in the transmission state (FIG. 25). FIG. 26E illustrates a state where the states of the perspective images shown in FIGS. 26A to 26D are superimposed.

As shown in FIGS. 26A to 26D, the image of the screen viewed with one eye of the viewer differs depending on which opening group is in the transmission state. The images are integrated to be perceived as shown in FIG. 26E, and thereby the luminance unevenness states perceived through the respective opening groups are integrated. As a result, the luminance unevenness is improved. FIGS. 27A to 27E illustrate this luminance unevenness integration. FIG. 27A illustrates a luminance distribution viewed from the viewing position P2 at the distance longer than the optimum viewing distance L2 in the case where only the opening group A is in the transmission state. FIG. 27B illustrates a luminance distribution viewed from the viewing position P2 in the case where only the opening group B is in the transmission state. FIG. 27C illustrates a luminance distribution viewed from the viewing position P2 in the case where only the opening group C is in the transmission state. FIG. 27D illustrates a luminance distribution viewed from the viewing position P2 when only the opening group D is in the transmission state. FIG. 27E illustrates a state where the luminance distributions shown in FIGS. 27A to 27D are superimposed. As can be seen from FIG. 27E, the luminance unevenness states perceived through the respective opening groups are integrated. As a result, the luminance unevenness is improved.

It is to be noted that the change order of the openings 21 is not limited to a case where the groups are turned into the transmission state sequentially from one group to the adjacent group, for example, as A (FIG. 22)→B (FIG. 23)→C (FIG. 24)→D (FIG. 25)→A (FIG. 22) and so on. Alternatively, the groups may be changed in the order in which one group is turned into the transmission state, and subsequently a group not adjacent to the group is turned into the transmission state, for example, as A→C→B→D→A and so on.

In the present modification example, M is increased, and thereby, luminance unevenness states are shifted in smaller scale to be integrated. Therefore, the luminance unevenness is further improved. The shift amount between the images viewed through the respective opening groups is smaller. Therefore, the flicker perceived in the screen is also suppressed.

[Second Embodiment]

Next, description will be given of a display device according to a second embodiment of the present disclosure. It is to be noted that like numerals are used to designate substantially like components of the display device according to the first embodiment, and the description thereof is appropriately omitted.

Figure 28:
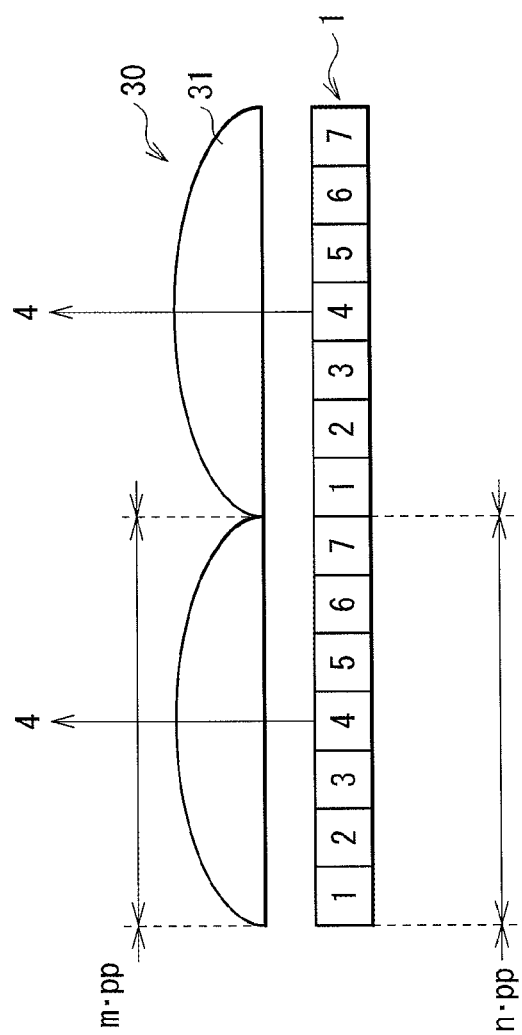
FIG. 28 is an explanatory diagram illustrating a first state in a case where a lenticular lens is used as the parallax generation section.
Figure 29:
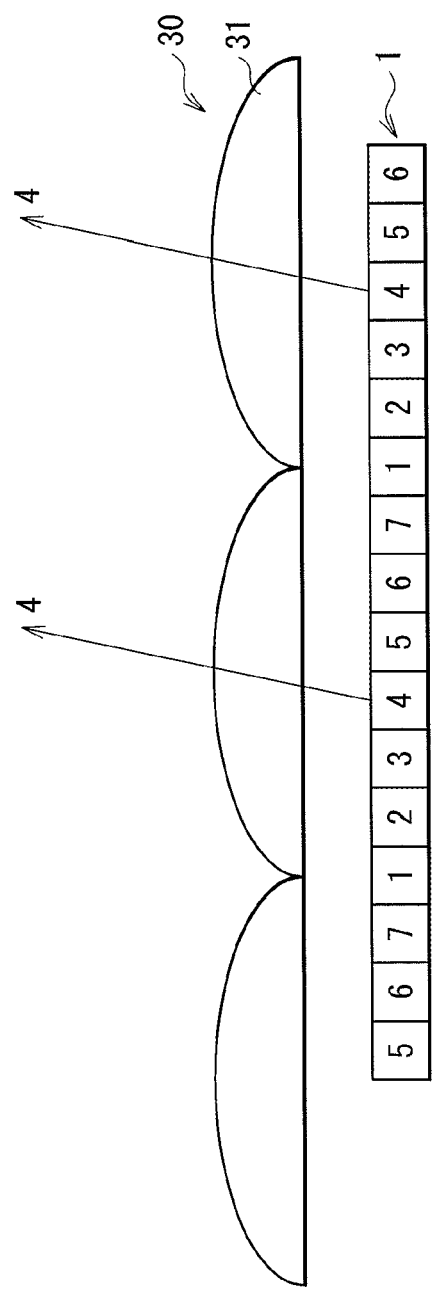
FIG. 29 is an explanatory diagram illustrating a second state in the case where the lenticular lens is used as the parallax generation section.

In the first embodiment, the description is given with an example where the parallax barrier (liquid crystal barrier 20) is used as the parallax generation section 2. However, as shown in FIGS. 28 and 29, a lenticular lens 30 may be used as the parallax generation section 2. The lenticular lens 30 includes a plurality of cylindrical lens elements 31. The lens elements each have a function as the traveling angle direction selector that selects light of each perspective image from each pixel 10 of the image display section 1 to be emitted.

FIGS. 28 and 29 illustrate an example in which N is 7 and M is 2. Since M is 2, the position of each lens element 31 is temporally changed between two positions as shown in FIGS. 28 and 29. The position of each lens element 31 may be physically moved at high speed, for example, using a piezoelectric device and/or the like. Alternatively, when a liquid lens being made of a liquid crystal material and utilizing reflective index anisotropy is used, the position of each lens element 31 may also be changed utilizing the relationship between transparent electrode arrangement and an applied electric field. Alternatively, a liquid lens may be used.

In the example shown in FIGS. 28 and 29, $L2/L1=(M \cdot bp)/(N \cdot pp)$ is established using L1 and L2 corresponding to those shown in FIG. 10. M·bp corresponds to a pitch of the lens element 31 in each state shown in FIGS. 28 and 29.

In the present embodiment, the lenticular lens 30 is used as the parallax generation section 2. Therefore, the present embodiment has an advantage that the image is displayed more brightly compared to the case where the parallax barrier is used.

[Third Embodiment]

Next, description will be given of a display device according to a third embodiment of the present disclosure. It is to be noted that like numerals are used to designate substantially like components of the display device according to the first and second embodiments, and the description thereof is appropriately omitted.

Figure 30:
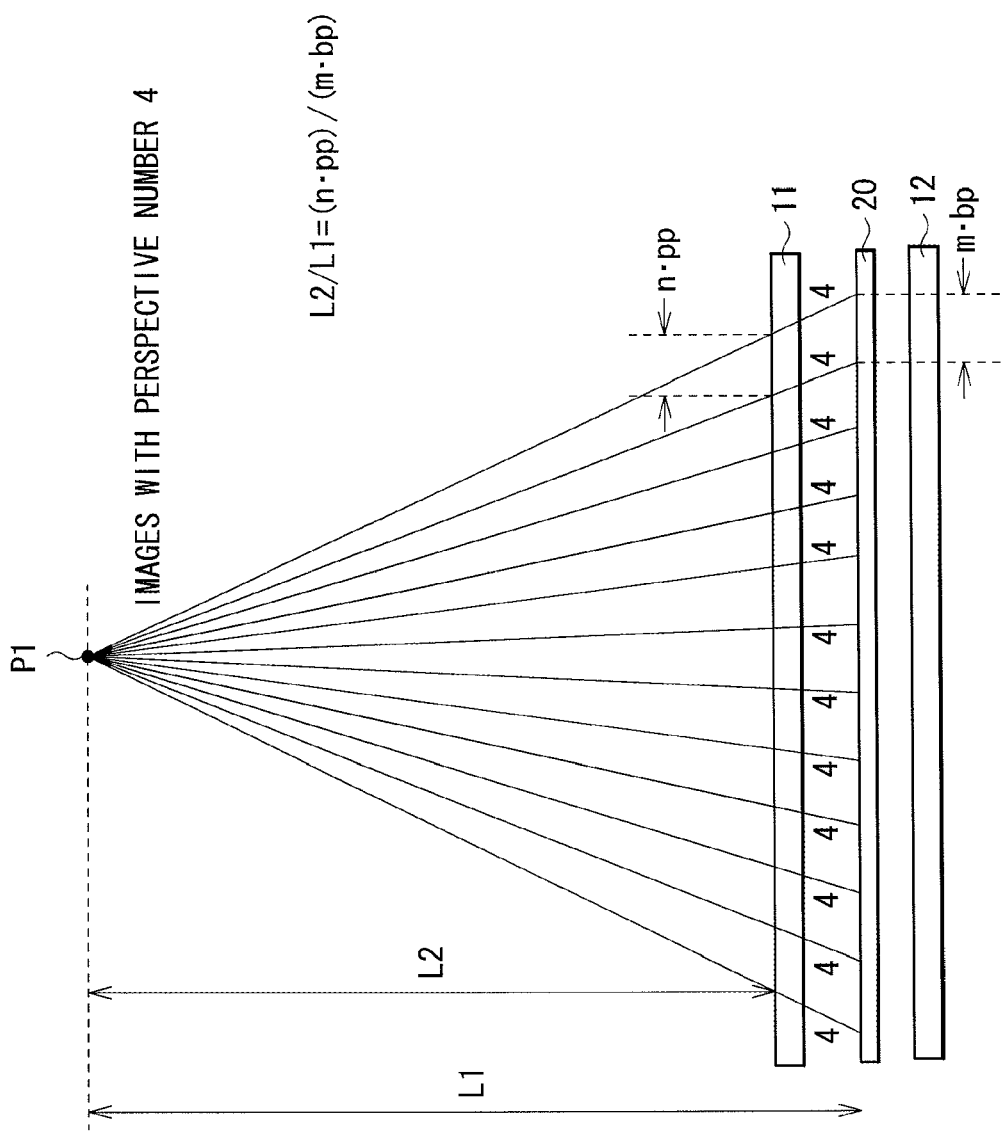
FIG. 30 is an explanatory diagram illustrating an embodiment in which the parallax generation section (liquid crystal barrier) is arranged between a backlight and the image display section.

In the first embodiment, the parallax generation section 2 (liquid crystal barrier 20) is disposed between the image display section 1 (liquid crystal panel 11) and the viewer. Alternatively, as shown in FIG. 30, the liquid crystal panel 11 may be disposed between the liquid crystal barrier 20 and the viewer. In this case, the liquid crystal barrier 20 is disposed between the liquid crystal panel 11 and the backlight 12.

In this case, $L2/L1=(N \cdot pp)/(M \cdot bp)$ is established. N is a non-integer multiple of M in this case as well. The value of N·pp is smaller than that of M·bp.

[Fourth Embodiment]

Next, description will be given of a display device according to a fourth embodiment of the present disclosure. It is to be noted that like numerals are used to designate substantially like components of the display device according to the first to third embodiments, and the description thereof is appropriately omitted.

Figure 31:
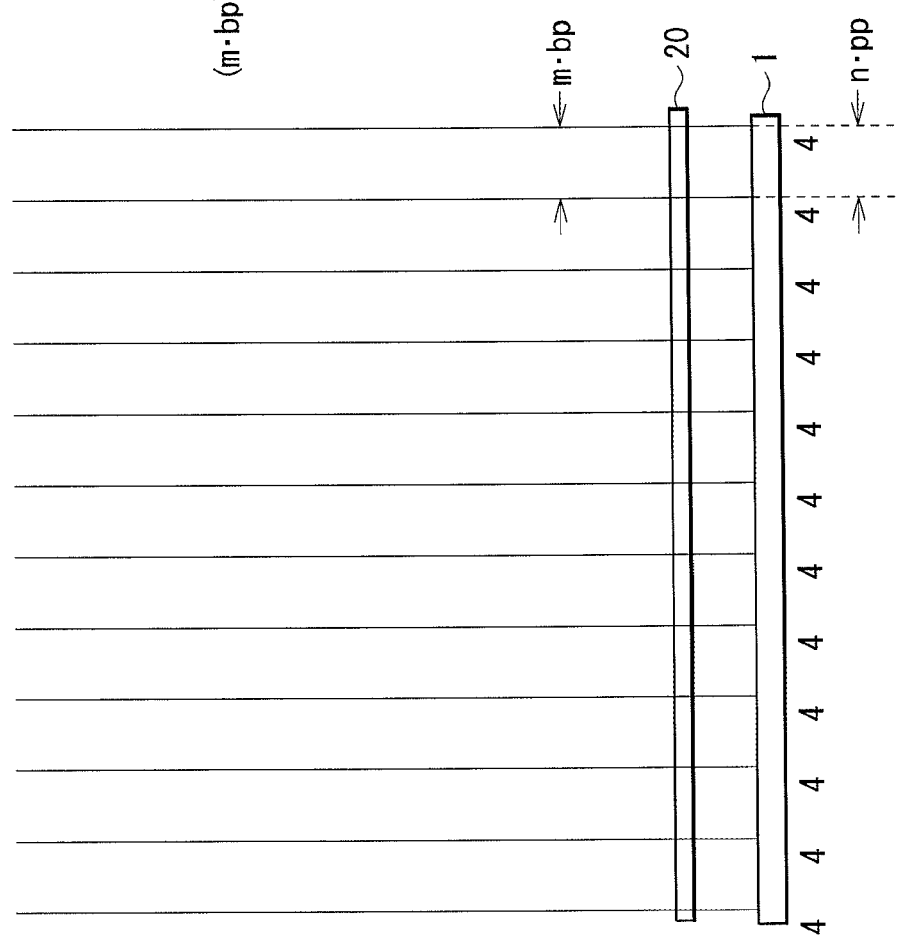
FIG. 31 is an explanatory diagram illustrating an embodiment applied to integral imaging.

The technology according to an embodiment of the present disclosure is applicable to integral imaging as shown in FIG. 31. In this case, $(M \cdot bp)=(N \cdot pp)$ is established. The parameters N and M are set to satisfy the condition of $0<M<N$ and the condition of N being a non-integer multiple of M as well in this case.

[Other Embodiments]

The technology of the present disclosure is not limited to those described in the above-described embodiments and the modification examples, and various modifications may be made.

For example, in the first, third, and fourth embodiments, the openings 21 of the liquid crystal barrier 20 may have a so-called diagonal barrier configuration in which the openings 21 are arranged not in the vertical direction but in the diagonal direction. Alternatively, the openings 21 of the liquid crystal barrier 20 may have a step barrier configuration. Also, in the second embodiment, the lens elements 31 of the lenticular lens 30 may have a diagonal lenticular configuration in which the lens elements 31 are arranged with a slope in a diagonal direction.

Moreover, in the circuit shown in FIG. 1, image signals of left and right (LR) may be inputted to the image display drive circuit 3 as the parallax image signal S1 to generate N-number of multiple perspective images based on the parallax information thereof in the image display drive circuit 3.

Figure 32:
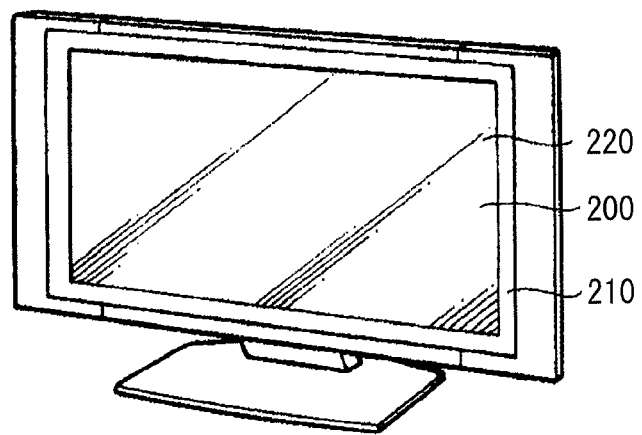
FIG. 32 is an appearance diagram illustrating an example of an electronic unit.

The display device according to any of the above-described embodiments and modification examples is applicable to various electronic units having a display function. FIG. 32 illustrates an appearance configuration of a television as an example of such an electronic unit. The television includes an image display screen section 200 including a front panel 210 and a filter glass 220. The display device according to any of the above-described embodiments and modifications is applicable to various devices such as, but not limited to, digital cameras, camcorders, mobile phones, and notebook personal computers, in addition to televisions.

It is possible to achieve at least the following configurations from the above-described exemplary embodiments and the modifications of the disclosure.

(1) A display device including:
a display section including a plurality of pixels, the display section allocating N-number of perspective images to the pixels to display the N-number of perspective images, where N is an integer representing number of the perspective images;
a display drive circuit cyclically changing a correspondence relationship between the perspective images and the pixels from one to another of first to Mth states, where M is an integer representing number of the states;
a plurality of selectors each selecting any from among traveling angle directions of a perspective image from the pixels; and
a selector drive circuit controlling positions of the selectors to be cyclically changed from one to another of first to Mth states, the selector drive circuit operating in synchronization with the display drive circuit, wherein
a relationship 0<M<N is established, and N is a non-integer multiple of M.

(2) The display device according to (1), wherein the selector drive circuit controls the positions of the selectors to be changed, to allow traveling angle directions of the perspective image to be different from each other between any two of the first to Mth states.

(3) The display device according to (1) or (2), wherein the selector drive circuit controls the positions of the selectors to be changed, to allow a position relationship, in a perspective image, between the selectors and the pixels to be different from each other between any two of the first to Mth states.

(4) The display device according to any one of (1) to (3), wherein a value of N·pp is different from a value of M·bp which is a pitch between any two adjacent selectors of the plurality of selectors in each of the first to Mth states, where pp represents a pitch of the pixels.

(5) The display device according to any one of (1) to (3), wherein a value of N·pp is equal to a value of M·bp which is a pitch between any two adjacent selectors of the plurality of selectors in each of the first to Mth states, where pp represents a pitch of the pixels.

(6) The display device according to any one of (1) to (5), including a parallax barrier having a plurality of openings, wherein the openings function as the selectors, respectively.

(7) The display device according to any one of (1) to (5), including a lenticular lens including a plurality of lens elements, wherein the lens elements function as the selectors, respectively.

(8) The display device according to any one of (1) to (7), wherein the selectors are disposed between the display section and a viewer.

(9) The display device according to any one of (1) to (7), wherein the display section is disposed between the selectors and a viewer.

(10) An electronic unit including a display device, the display device including:
a display section including a plurality of pixels, the display section allocating N-number of perspective images to the pixels to display the N-number of perspective images, where N is an integer representing number of the perspective images;
a display drive circuit cyclically changing a correspondence relationship between the perspective images and the pixels from one to another of first to Mth states, where M is an integer representing number of the states;
a plurality of selectors each selecting any from among traveling angle directions of a perspective image from the pixels; and a selector drive circuit controlling positions of the selectors to be cyclically changed from one to another of first to Mth states, the selector drive circuit operating in synchronization with the display drive circuit, wherein
a relationship 0<M<N is established, and N is a non-integer multiple of M.

The present application contains subject matter related to that disclosed in Japanese Priority Patent Application JP 2011-187457 filed in the Japan Patent Office on Aug. 30, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A display device comprising:
a display section including a plurality of pixels, the display section allocating N perspective images to the pixels to display the N perspective images, where N is an integer representing a number of perspective images;
a display drive circuit cyclically changing a correspondence relationship between the N perspective images and the pixels between M states, where M is an integer representing a number of states;
a plurality of selectors each selecting at a time a traveling angle direction from the pixels of a perspective image of the N perspective images; and
a selector drive circuit controlling positions of the plurality of selectors to be cyclically changed between the M states, the selector drive circuit operating in synchronization with the display drive circuit,
wherein a relationship 0<M<N is established, and N is a non-integer multiple of M.

2. The display device according to claim 1, wherein the selector drive circuit controls the positions of plurality of selectors to be changed, to allow traveling angle directions of a perspective image at a time to be different from each other between any two of the M states.

3. The display device according to claim 1, wherein the selector drive circuit controls the positions of the plurality of selectors to be changed, to allow a position relationship, in a perspective image at a time, between the plurality of selectors and the pixels to be different from each other between any two of M states.

4. The display device according to claim 1, wherein a value of N·pp is different from a value of M·bp that is a pitch between any two adjacent selectors of the plurality of selectors in a same state of the M states, where pp represents a pitch of the pixels and bp represents a pitch of the selectors.

5. The display device according to claim 1, wherein a value of N·pp is equal to a value of M·bp that is a pitch between any two adjacent selectors of the plurality of selectors in a same state of the M states, where pp represents a pitch of the pixels and bp represents a pitch of the selectors.

6. The display device according to claim 1, comprising a parallax barrier having a plurality of openings, wherein the openings function as the selectors, respectively.

7. The display device according to claim 1, comprising a lenticular lens including a plurality of lens elements, wherein the lens elements function as the selectors, respectively.

8. The display device according to claim 1, wherein the selectors are disposed between the display section and a viewer.

9. The display device according to claim 1, wherein the display section is disposed between the selectors and a viewer.

10. An electronic unit comprising:
a display device, the display device comprising:
- a display including a plurality of pixels, the display allocating N perspective images to the pixels to display the N perspective images, where N is an integer representing a number perspective images;
- a display drive circuit cyclically changing a correspondence relationship between the N perspective images and the pixels between M states, where M is an integer representing a number of states;
- a plurality of selectors each selecting at a time a traveling angle direction from the pixels of a perspective image of the N perspective images; and
- a selector drive circuit controlling positions of the plurality of selectors to be cyclically changed between the M states, the selector drive circuit operating in synchronization with the display drive circuit,
- wherein a relationship $0<M<N$ is established, and N is a non-integer multiple of M.

* * * * *